(12) United States Patent
Rumbaugh et al.

(10) Patent No.: US 12,074,297 B2
(45) Date of Patent: Aug. 27, 2024

(54) DETACHABLE AUXILIARY POWER SYSTEM

(71) Applicant: OX PARTNERS, LLC, Wilsonville, OR (US)

(72) Inventors: Scott Rumbaugh, Wilsonville, OR (US); Monte Cook, Wilsonville, OR (US)

(73) Assignee: OX PARTNERS, LLC, Wilsonville, OR (US)

( * ) Notice: Subject to any disclaimer, the term of this patent is extended or adjusted under 35 U.S.C. 154(b) by 0 days.

(21) Appl. No.: 18/445,042

(22) Filed: Mar. 14, 2023

(65) Prior Publication Data

US 2023/0299368 A1    Sep. 21, 2023

Related U.S. Application Data

(62) Division of application No. 16/667,660, filed on Oct. 29, 2019, now Pat. No. 11,605,960.

(Continued)

(51) Int. Cl.

| | |
|---|---|
| *H01M 10/42* | (2006.01) |
| *H01M 50/20* | (2021.01) |
| *H01M 50/202* | (2021.01) |
| *H01M 50/244* | (2021.01) |
| *H01M 50/296* | (2021.01) |

(Continued)

(52) U.S. Cl.
CPC ......... *H01M 10/425* (2013.01); *H01M 50/20* (2021.01); *H01M 50/202* (2021.01); *H01M 50/244* (2021.01); *H01M 50/296* (2021.01); *H01M 50/50* (2021.01); *H01R 33/05* (2013.01); *H02J 1/122* (2020.01); *H02J 7/00* (2013.01); *H02J 7/0044* (2013.01);

(Continued)

(58) Field of Classification Search
USPC .......................................................... 320/105
See application file for complete search history.

(56) References Cited

U.S. PATENT DOCUMENTS

| | | |
|---|---|---|
| 4,350,746 A | 9/1982 | Chambers |
| 5,867,007 A | 2/1999 | Kim |

(Continued)

FOREIGN PATENT DOCUMENTS

| | | |
|---|---|---|
| CN | 102340168 A | 2/2012 |
| DE | 202007010968 U1 | 2/2008 |

(Continued)

*Primary Examiner* — Mohammed Alam
(74) *Attorney, Agent, or Firm* — Schwabe, Williamson & Wyatt, P.C.

(57) ABSTRACT

Detachable auxiliary power systems are disclosed. In some embodiments, the power system comprises a housing with a cavity, and a detachable portion configured to be received into the cavity. The detachable portion includes a power source such as a rechargeable battery, and may include additional electrical circuits to manage the charge and discharge of the battery. The housing includes a cable for electrically connecting the housing to an external electrical system, such as a vehicle electrical system. When the detachable portion is inserted into the housing, it is electrically connected to the cable, and so able to be charged from the external electrical system, and selectively provide power from the power source to the external electrical system, such as for jump-starting a vehicle.

12 Claims, 10 Drawing Sheets

Related U.S. Application Data

(60) Provisional application No. 62/752,302, filed on Oct. 29, 2018.

(51) Int. Cl.
*H01M 50/50* (2021.01)
*H01R 33/05* (2006.01)
*H02J 1/10* (2006.01)
*H02J 7/00* (2006.01)

(52) U.S. Cl.
CPC .......... *H02J 7/0045* (2013.01); *H02J 7/0047* (2013.01); *H01M 2220/20* (2013.01)

(56) References Cited

U.S. PATENT DOCUMENTS

| | | | |
|---|---|---|---|
| 5,889,384 A * | 3/1999 | Hayes | H02J 50/10 320/108 |
| 5,982,138 A | 11/1999 | Krieger | |
| 6,002,235 A | 12/1999 | Clore | |
| 6,201,370 B1 | 3/2001 | Reller et al. | |
| 6,799,993 B2 | 10/2004 | Krieger et al. | |
| 7,199,555 B2 | 4/2007 | Hung | |
| 7,508,163 B2 | 3/2009 | Batts-Gowins | |
| 8,013,567 B2 | 9/2011 | Windsor | |
| 8,493,021 B2 | 7/2013 | Richardson et al. | |
| 9,007,015 B1 | 4/2015 | Nook et al. | |
| 9,653,933 B2 | 5/2017 | Inskeep | |
| 10,044,197 B2 | 8/2018 | Fry et al. | |
| 10,075,000 B2 | 9/2018 | Miller et al. | |
| 10,135,271 B2 | 11/2018 | Miller et al. | |
| 10,247,400 B2 | 4/2019 | Cate | |
| 10,432,004 B2 | 10/2019 | Rumbaugh et al. | |
| 2005/0035741 A1 | 2/2005 | Elder et al. | |
| 2014/0139175 A1 | 5/2014 | Gonzalez | |
| 2014/0159509 A1 | 6/2014 | Inskeep | |
| 2016/0303990 A1 * | 10/2016 | Penilla | B60L 53/80 |
| 2017/0093190 A1 * | 3/2017 | Miller | H02J 7/0044 |
| 2017/0214263 A1 * | 7/2017 | Fathollahi | G06F 3/04842 |
| 2018/0301919 A1 | 10/2018 | Rumbaugh et al. | |
| 2019/0072242 A1 | 3/2019 | Worman et al. | |
| 2020/0036206 A1 | 1/2020 | Rumbaugh et al. | |
| 2020/0136408 A1 * | 4/2020 | Rumbaugh | H01M 10/425 |
| 2021/0075235 A1 | 3/2021 | Nook et al. | |

FOREIGN PATENT DOCUMENTS

| | | |
|---|---|---|
| DE | 202007010969 U1 | 2/2008 |
| JP | 2012-517208 A | 3/2014 |
| KR | 20160089120 A1 | 7/2016 |
| KR | 101777375 B1 | 9/2017 |
| WO | 2014142759 A1 | 9/2014 |

\* cited by examiner

DETACHABLE AUXILIARY POWER SYSTEM

CROSS-REFERENCE TO RELATED APPLICATION

This application claims the benefit of U.S. Provisional Patent Application No. 62/752,302 filed Oct. 29, 2018 and titled DETACHABLE AUXILIARY POWER SYSTEM, and U.S. patent application Ser. No. 16/667,660 filed on Oct. 29, 2019, the entire disclosures of which are hereby incorporated by reference.

TECHNICAL FIELD

The present disclosure relates to the field of power systems. More particularly, the present disclosure relates to an auxiliary power system designed to start a vehicle.

BACKGROUND

Most modern vehicles, regardless of engine type, require electrical power to operate various engine systems, e.g. fuel pumps, injectors, ignition systems, in addition to fuel. While the engine is running, an alternator or generator that is turned by the engine typically supplies all the vehicle's electrical needs. However, when the engine is stopped, the alternator or generator is not turning, and so cannot generate the necessary electrical energy. Vehicles typically use some form of an electric-powered motor to turn over and start their internal combustion engine. Power to drive the motor, as well as to supply electricity to the other electrically-powered engine components, is usually supplied by one or more rechargeable batteries until the engine starts. Once the engine starts, the alternator or generator, which is part of the vehicle's charging system, also recharges the one or more batteries so that they can supply sufficient power for the next engine start.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
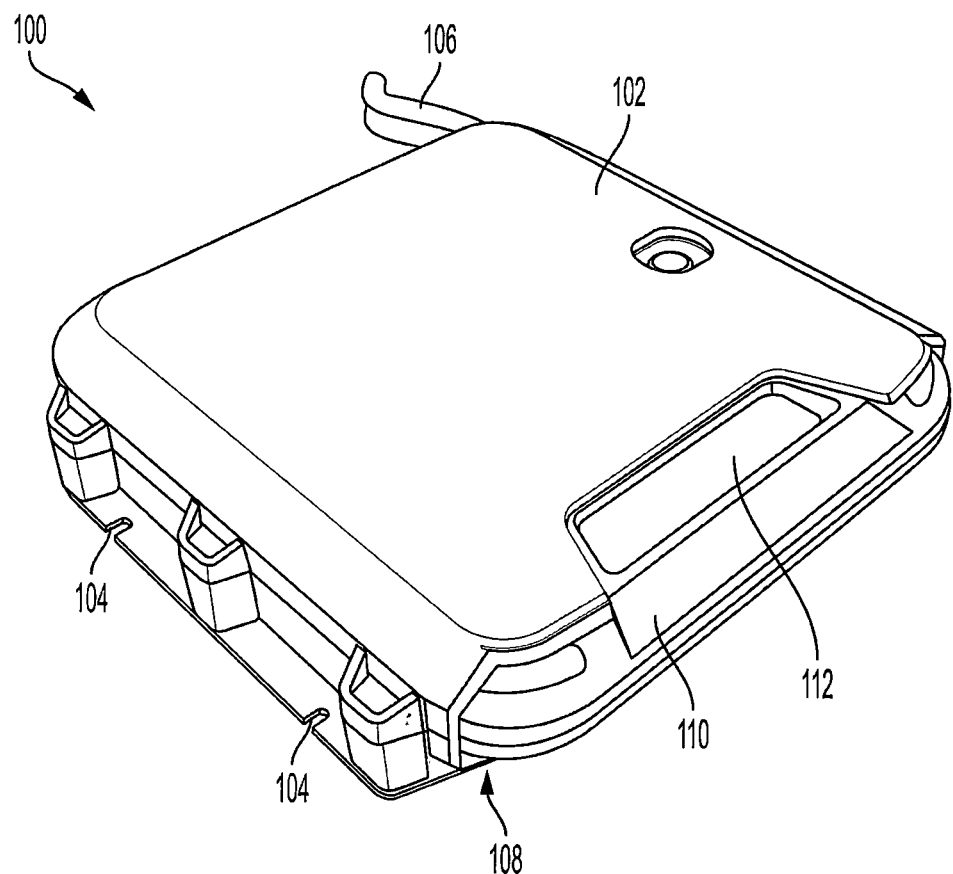
FIG. 1 illustrates a perspective view of an example detachable auxiliary power system, according to various embodiments.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Engines require a continuous electrical source to start as well as to run. Most vehicles include one or more rechargeable batteries to provide the necessary electrical energy to facilitate starting. These batteries are usually manufactured with a lead-acid or similarly suitable rechargeable chemistry, and are configured to deliver a large amount of current for a relatively short period of time (typically less than 30 seconds). This power delivery profile is necessary to adequately power the starter motor, which can draw several hundred amps while it is turning over the engine, before the engine starts. The battery can then slowly be recharged by the vehicle alternator or generator.

A car battery may fail to start a vehicle for a variety of different reasons. Once a car battery reaches its end of life, it will typically fail to hold a sufficient charge to start the vehicle, despite being charged for an otherwise sufficient amount of time. If an electrical system in the vehicle, e.g. the headlights, interior lights, car stereo, is left turned on for a long enough time while the engine is not running, it will drain the battery's charge below the amount necessary to start the vehicle. If one or more components of the vehicle's charging system fails, the battery may fail to be recharged following a start. In some instances, such as where the alternator fails, the battery may further be drained following start while the vehicle is running by the various electrical systems of the engine. Eventually, the engine may stall when the battery is drained below a charge sufficient to power various systems necessary for engine operation. In all circumstances, the discharged battery results in a disabled vehicle.

One well-known solution to start a vehicle with a discharged battery is to jump-start the vehicle. As is known, in the jump-start process, the electrical system of a second vehicle is temporarily connected in parallel to the discharged vehicle's battery, and so supplies the necessary current to allow the disabled vehicle to start. Once started, the disabled vehicle's alternator or generator takes over powering the vehicle, and recharging the battery. Jump-starting, as will be recognized, requires the presence of another vehicle along with a set of cables to make the temporary electrical connection. Alternatively, a portable jump-starter may be used. Thus, jump-starting is not feasible if the disabled vehicle is not located proximate to another vehicle or a set of jumper cables or portable jump-starter is not available. Further, where a vehicle becomes disabled due to a failure in the vehicle's charging system (such as a failed alternator), jump-starting cannot practically be used, as the vehicle would stall shortly after the jumper cables were removed due to the battery still being in a discharged state. In either case, a disabled vehicle may pose a safety threat to the driver and other vehicle occupants by leaving them stranded until suitable assistance can be obtained.

Some larger vehicles, such as commercial trucks, may address this situation by equipping a second car battery, either running in parallel with the first car battery, or switchable by the driver. However, most passenger cars and trucks lack sufficient room under the hood to accommodate a permanently installed second car battery, which is typically heavy and bulky, and/or would require using up valuable cargo space in the trunk.

Disclosed embodiments include a two-part auxiliary power system that can act as an emergency or auxiliary power source for starting and/or running a vehicle, or any other device requiring a portable power supply. In embodiments, the power system uses a lithium-ion (Li-ion) battery. Li-ion battery offer both a high energy density and the ability to rapidly discharge at high current levels, including current sufficient to start a car, if a battery is properly sized and configured. Li-ion batteries are also smaller and lighter than a given lead-acid battery for a given power capacity, can be shaped to a variety of different form factors, and so allow the auxiliary power system to consume less space. Thus, the auxiliary power system can consume less space, or be stowed or mounted in a location on a vehicle that would otherwise be unused, such as under a seat. A wide variety of Li-ion battery chemistries may be suitable for use in the disclosed invention, including Lithium Iron Phosphate. Alternatively, other types of rechargeable batteries may be used in the disclosed embodiment.

The battery may provide an alternative power source for starting or a supplemental power source for jump-starting the vehicle. In some embodiments, the auxiliary power system may be installed or otherwise connected to the vehicle power system to provide an alternative power source for starting or a supplemental power source for jump-starting the vehicle, without requiring a manual temporary attachment to the vehicle battery. In various embodiments, the two-part configuration of the auxiliary power system allows a detachable portion including the battery to be removed from a housing. The housing can be stored or affixed in a suitable location on the vehicle. Removing the detachable portion can allow the battery to be used apart from the vehicle and/or apart from the vehicle electrical system, such as for powering accessories, e.g. tire pump, cell phone, laptop or starting or jump-starting jump another vehicle. In some embodiments, the detachable portion can include one or more safety features, such as a flashlight, warning lights, sounds, buzzers, and/or other suitable signaling devices, that may be useful in an emergency situation and/or to signal assistance.

The contents of U.S. Pat. No. 10,432,004 are hereby incorporated by reference as if set forth herein. To the extent that identical or similar terminology is used differently or with a different meaning than in U.S. Pat. No. 10,432,004, this disclosure is controlling. Other features and possible embodiments will be described below.

FIG. 1 illustrates a perspective view of an example detachable auxiliary power system 100, according to various embodiments. The detachable auxiliary power system 100 may be mountable within a vehicle (such as car) and may be coupled to an electrical system of the vehicle to charge, and/or maintain a charge, of a battery of the detachable auxiliary power system 100. For example, the detachable auxiliary power system 100 may be mounted under a seat within the vehicle, within a trunk of the vehicle, under the hood, or other portions of the vehicle that may be easily accessible to an operator of the vehicle.

The detachable power system 100 may include a housing 102 that can be utilized to mount the detachable power system 100 within the vehicle. In some embodiments, the housing 102 includes one or more apertures and/or recesses (such as recesses 104) that may receive fasteners (such as screws, bolts, nuts, or similar fasteners) utilized to mount the detachable power system to the vehicle. In such embodiments, housing 102 is essentially permanently mounted to the vehicle, permanent meaning that installation involves tools and fasteners such that the housing 102 is not intended to be routinely removed, and would require tools for removal.

The housing 102 may include a power cable 106 that extends from the housing 102. The power cable 106 may couple to a power source (such as a vehicle battery or vehicle electrical system) of the vehicle. In some embodiments, the power cable 106 may be directly coupled to the vehicle battery or the starter circuit of the vehicle. In these embodiments, the power cable 106 may be a relatively large gauge cable, and may be utilized for charging the battery of the detachable auxiliary power system 100 and/or providing power from the detachable auxiliary power system 100 to the vehicle battery or vehicle electrical system (such as to jump-start the vehicle). The power cable 106, if passing through the vehicle passenger cabin in a permanent installation, may be routed under trim or panels to effectively conceal the cable, and spliced or otherwise permanently wired into the vehicle's electrical system.

In other embodiments, including semi-permanent or temporary installations, the power cable 106 may be coupled to a power port (such as a cigarette lighter, a universal serial bus (USB) port, an internal vehicle wiring harness, or other power outlets of the vehicle) that may be powered by the vehicle electrical system. In the embodiments where the power cable 106 is coupled to such a power port, the power cable 106 may only be utilized for charging of the detachable auxiliary power system 100. In these embodiments, the power cable 106 may be a smaller gauge as the high current draw required for providing power to the vehicle battery is not required in these embodiments. In such embodiments, the detachable portion 110 (discussed below) would be removed from the housing 102 and temporarily connected to the car battery via a jumper cable (such as jumper cable 1600, discussed below) when the vehicle needs to be jump-started.

The housing 102 may further include a recess 108 into which a detachable portion 110 of the auxiliary power system 100 may be received. In particular, the recess 108 may be shaped to receive the detachable portion 110 such that the detachable portion 110 may be slid into and out of the housing 102. Further, the housing 102 may include a connector coupled to the power cable 106 that abuts the recess 108 and couples to the detachable portion 110 when the detachable portion 110 is located within the housing 102. In other embodiments, recess 108 may be partially or fully open on one or more sides (other than the top opening depicted in FIG. 1), e.g., housing 102 instead is configured as a cradle or an open panel or platform, with a latching mechanism to secure to a feature on the detachable portion 110 such as one or more recesses or protrusions.

The detachable portion 110 may include a release button 112 that releases the detachable portion 110 from the housing 102 when depressed. In particular, the detachable portion 110 may be affixed within the housing 102 when inserted all the way into the recess 108 and may remain affixed within the housing 102 until the release button 112 is depressed. Detachable portion 110 may secure by a suitable latching mechanism (not shown), as may be known in the art, equipped to housing 102, which is actuated or otherwise retracted from detachable portion 110 by operating the release button 112. Once the release button 112 has been depressed, the detachable portion 110 may be removed from the housing 102 (such as by sliding the detachable portion 110 from the housing 102). In other embodiments, the release button 112 may be replaced by another actuator for securing and/or releasing the detachable portion 110 from the housing 102, e.g. a lever, switch, toggle, etc. In still other embodiments, the release button 112 may be equipped to detachable portion 110, with a portion or all of the latching mechanism installed to the detachable portion 110. Depending upon the type of latching mechanism selected, detachable portion 110 may be secured back to housing 102 by insertion, with the latching mechanism acting as a one-way catch and automatically securing detachable portion 110 once fully inserted, or by actuating release button 112 to secure the detachable portion 110 once properly inserted. In other embodiments, the mechanism for securing and or releasing the detachable portion 110 may be part of, attached to, or in the vicinity of the housing 102.

The detachable portion 110 and/or the housing 102 may have a sensor (not shown) or other similar device or mechanism to verify the detachable portion 110 is fully inserted into 102. This ensures the detachable portion 110 is securely latched and/or properly electrical coupled to the housing 102 and/or the cable 106.

The detachable portion 110 may include the battery of the auxiliary power system 100, as well as circuitry for charging the battery and/or for providing power to jump-start the vehicle, or the battery of another vehicle. Alternatively, some or all the circuitry for charging the battery and/or for providing power to jump-start the vehicle may be contained within the housing 102. Accordingly, when the detachable portion 110 is removed from the housing 102, the battery of the auxiliary power system 100 may be maintained in the detachable portion 110. The battery of detachable portion 110 may be implemented using a light weight, high power density rechargeable chemistry such as lithium-ion, lithium-polymer (LiPo), Lithium Iron Phosphate, or another suitable chemistry, that can provide the current necessary to jump-start a vehicle in a relatively compact package. Other suitable battery chemistries that are now known or later developed may be utilized, depending upon the requirements of a given implementation. In some implementations, the battery may be replaceable in detachable portion 110, which may be useful when the battery reaches the end of its life, to replace the battery with one with different performance characteristics, or for any other reason. In other implementations, the battery may be non-removable, and the entire detachable portion 110 may be replaced once the battery no longer holds a sufficient charge or is otherwise unsuitable for continued use. The battery may be configured to output approximately the voltage required by the vehicle system, e.g. 12-14 VDC, or may output a different voltage and rely upon conversion circuitry either in the detachable portion 110 and/or housing 102 to provide conversion between the vehicle electrical system voltage and the battery voltage.

When removed, the detachable portion 110 may be coupled to the vehicle battery or vehicle electrical system, or the battery or vehicle electrical system of another vehicle, and may be utilized for providing power to jump-start the vehicle or another vehicle (such as for jump-starting the vehicle or the other vehicle). In some embodiments, multiple housings 102 may each be installed in different vehicles, and detachable portion 110 may be swapped between vehicles with an installed housing 102 as necessary.

Detachable portion 110 and/or the housing 102 may be configured with a weather proof, water resistant, or waterproof housing, to allow mounting or use in damp and/or dusty conditions.

Figure 2:
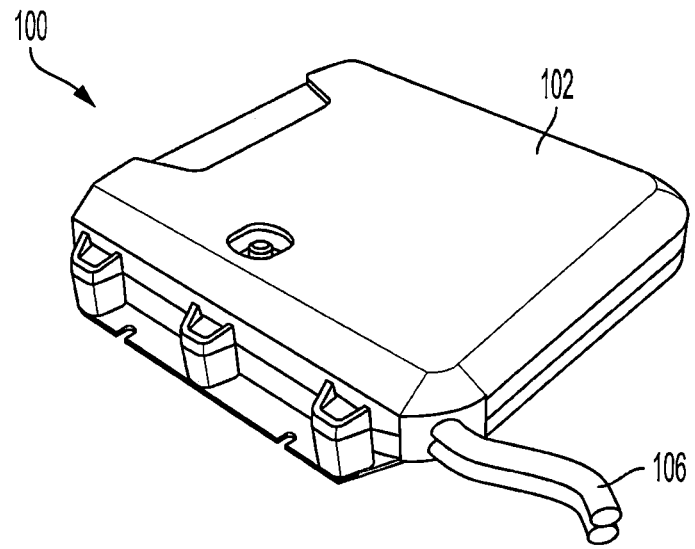
FIG. 2 illustrates another perspective view of the example detachable auxiliary power system, according to various embodiments.

FIG. 2 illustrates another perspective view of the example detachable auxiliary power system 100, according to various embodiments. In particular, the power cable 106 is illustrated extending from a side of the housing 102. While the power cable 106 is illustrated extending from an opposite side of housing 102 from the recess 108 (FIG. 1) in the illustrated embodiment, it is to be understood that the power cable 106 may extend from any other sides of the housing 102 in other embodiments. In various embodiments, the power cable 106 may attach to housing 102 via a suitable connector, or may be hardwired and non-detachable.

Figure 3:
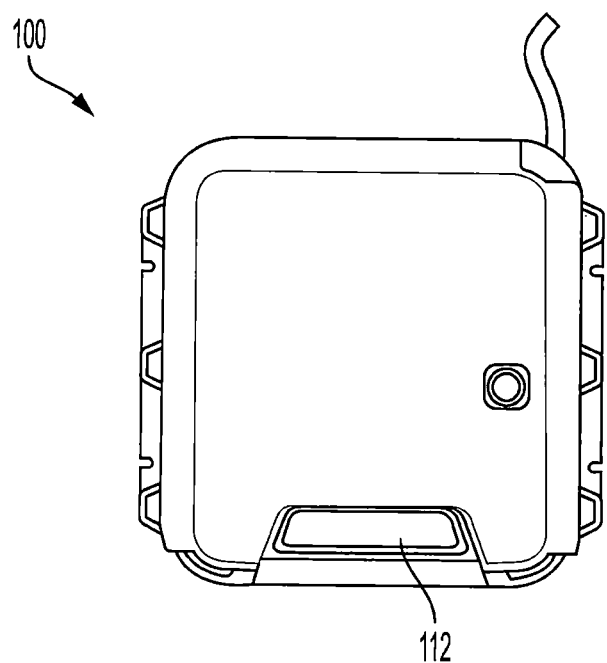
FIG. 3 illustrates a top view of the example detachable auxiliary power system, according to various embodiments.

FIG. 3 illustrates a top view of the example detachable auxiliary power system 100, according to various embodiments. The release button 112 is illustrated as being located toward a top side of the auxiliary power system 100. In other embodiments, the release button 112 may be located at other locations of the auxiliary power system 100, e.g. other locations on either housing 102 or detachable portion 110.

Figure 4:
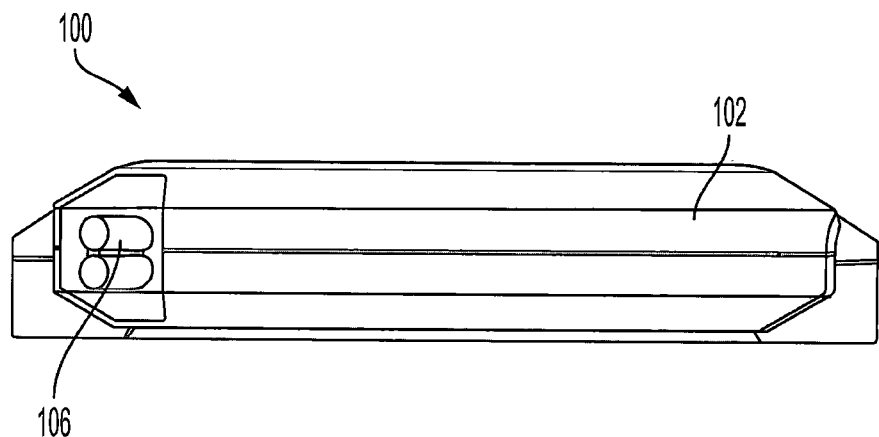
FIG. 4 illustrates a side view of the example detachable auxiliary power system, according to various embodiments.

FIG. 4 illustrates a side view of the example detachable auxiliary power system 100, according to various embodiments. In particular, FIG. 4 illustrates a backside of the auxiliary power system 100, the backside being opposite to the recess 108 (FIG. 1). The power cable 106 is illustrated as extending from a backside of the housing 102.

Figure 5:
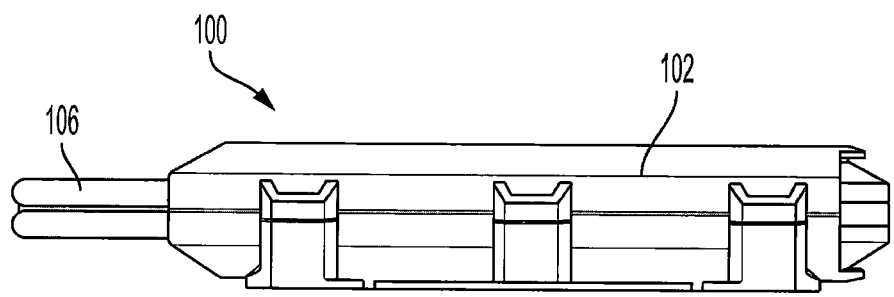
FIG. 5 illustrates another side view of the example detachable auxiliary power system, according to various embodiments.

FIG. 5 illustrates another side view of the example detachable auxiliary power system 100, according to various embodiments. The power cable 106 is illustrated as extending from a backside of the housing 102.

Figure 6:
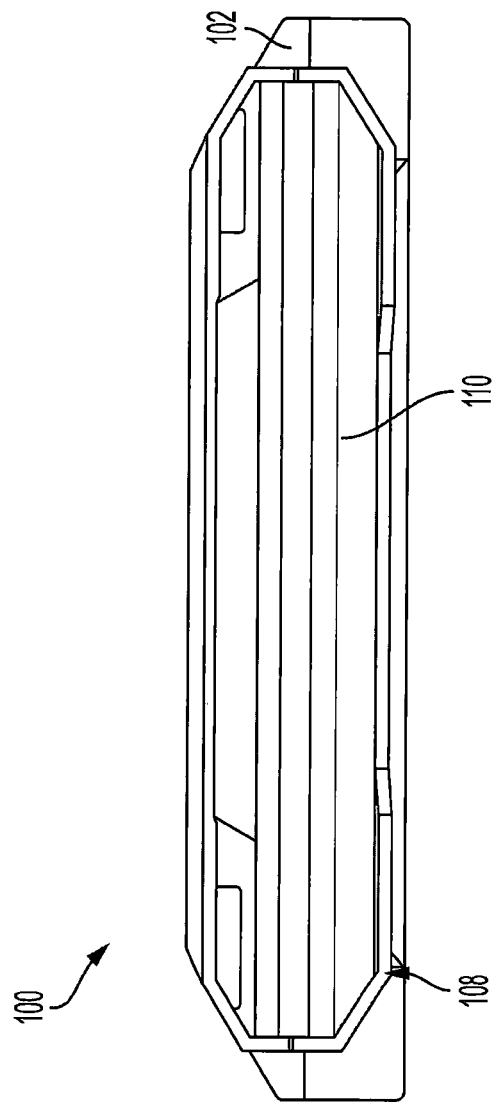
FIG. 6 illustrates another side view of the example detachable auxiliary power system, according to various embodiments.

FIG. 6 illustrates another side view of the example detachable auxiliary power system 100, according to various embodiments. In particular, a front side of the detachable auxiliary power system 100 is illustrated, where the recess 108 is located at the front side of the detachable auxiliary power system 100. The detachable portion 110 of the auxiliary power system 100 is illustrated within the housing 102 of the auxiliary power system 100.

Figure 7:
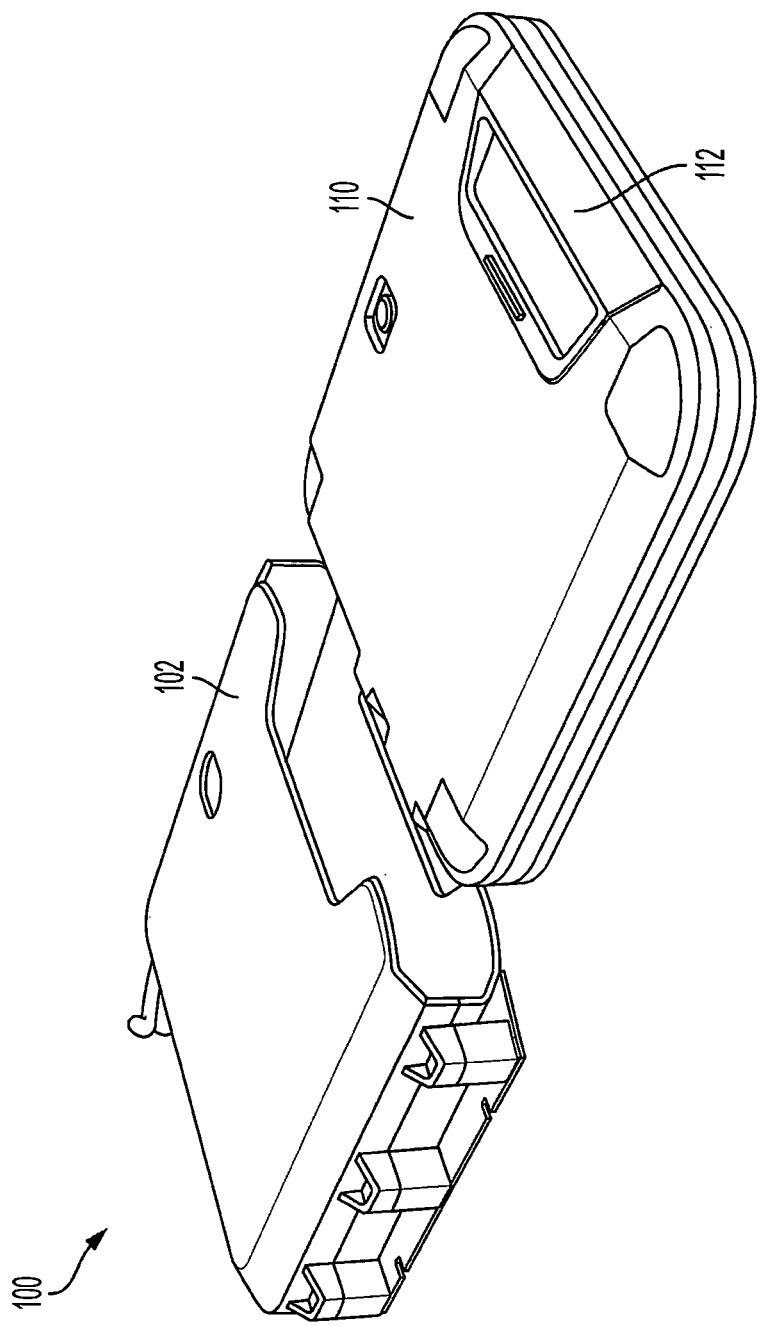
FIG. 7 illustrates a perspective view of the example detachable auxiliary power system in a detached arrangement, according to various embodiments.

FIG. 7 illustrates a perspective view of the example detachable auxiliary power system 100 in a detached arrangement, according to various embodiments. In particular, the detachable portion 110 of the detachable auxiliary power system 100 is removed from the housing 102. The detachable portion 110 may have been removed by depressing the release button 112 and applying a force to the detachable portion 110 that caused the detachable portion 110 to be removed from the housing 102. Other methods of securing and removing the detachable portion 110 from the housing 102 may be employed without departing from invention.

Figure 8:
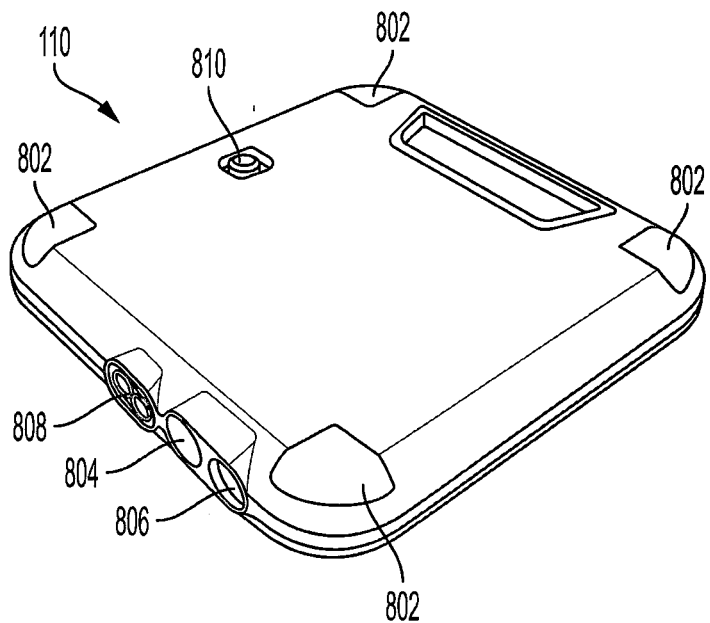
FIG. 8 illustrates a perspective view of the detachable portion of the detachable auxiliary power system, according to various embodiments.

FIG. 8 illustrates a perspective view of the detachable portion 110 of the detachable auxiliary power system 100 (FIG. 1), according to various embodiments. The detachable portion 110 may include one or more indicators, such as lights 802, and/or other safety devices or signals, e.g. sounds, horns, alarms, etc. In some embodiments, the lights 802 may be emergency flashers that flash when the detachable portion 110 is removed from the housing 102. The lights 802 may include selectable flashing patterns, constant on, etc. In other embodiments, the detachable portion 110 may include a power switch that turns the lights 802 on and off. The detachable portion 110 may further include a flashlight 804 and a switch 806 that turns the flashlight on and off. Alternatively, a switch 806 may turn the flashers on and off and turn the flashlight on or off. Other devices that may be equipped to detachable portion 110 may have separate switches or other means of activation. In some embodiments, the lights 802, flashlight 804, and/or other safety or signaling devices may alternatively or additionally be controlled wirelessly or remotely, such as via a smartphone app, remote control, or other suitable means.

The detachable portion 110 may further include a connector 808. When the detachable portion 110 is located within the housing 102 (FIG. 1), the connector 808 may couple to the power cable 106 (FIG. 1) (such as via the connector that abuts the recess 108 (FIG. 1)) and may receive power for charging a battery of the detachable auxiliary power system and/or may provide power to jump-start the vehicle. When the detachable portion 110 is removed from the housing 102, the connector 808 may, in some embodiments, be connected to a jumper cable, such as jumper cable 1600 discussed below, and coupled to the vehicle battery or vehicle electrical system, or the battery or vehicle electrical system of another vehicle, and may be utilized for providing power to the vehicle battery or vehicle electrical system, or the battery or vehicle electrical system of the other vehicle (such as for jump-starting the vehicle).

The detachable portion 110 may further include a button 810 for activating the detachable portion 110 for providing power to the vehicle battery or vehicle electrical system, or the battery or vehicle electrical system of the other vehicle. In some embodiments, depressing button 810, particularly where the vehicle's battery lacks sufficient charge to start the vehicle, causes the battery of detachable portion 110 to be electrically connected to the vehicle's electrical system such that sufficient power can flow from the battery to the vehicle electrical system to allow the vehicle to start. In some embodiments, the switching circuitry effecting the electrical connection may be located in detachable portion 110. In other embodiments, the switching circuitry may be located in housing 102, and receive a signal to connect when button 810 is depressed. It should be understood that button 810 may be implemented using any suitable switch or toggle that can trigger the necessary circuit to connect the battery of detachable portion 810 to the vehicle to allow starting.

Alternatively, the detachable portion 110 may be activated remotely using a wirelessly connected device such as a smart phone or other mobile electronic device. In particular, the detachable portion 110 may provide power to the vehicle battery or vehicle electrical system, or the battery or vehicle electrical system of the other vehicle when the button 810 is depressed, for a predetermined time after the button has been depressed, or some combination thereof. In some embodiments, intelligent circuitry may be employed that eliminates the need for button 810. Such circuitry may allow current to flow from the vehicle electrical system to charge the battery in detachable portion 110 in normal operation, but automatically allow detachable portion 110 to supply current to the vehicle electrical system when the voltage of the vehicle electrical system drops below a predetermined threshold or it is otherwise determined that the vehicle requires power from the detachable portion 110 to start.

Figure 9:
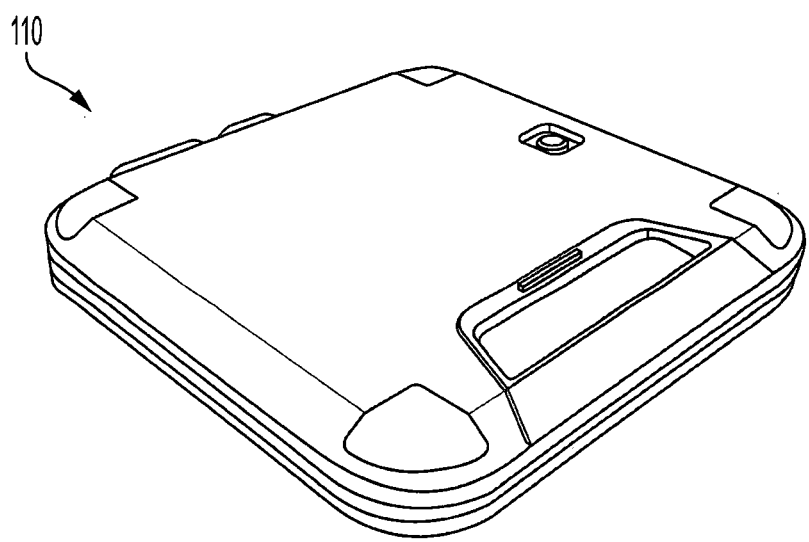
FIG. 9 illustrates another perspective view of the detachable portion of the detachable auxiliary power system, according to various embodiments.

FIG. 9 illustrates another perspective view of the detachable portion 110 of the detachable auxiliary power system 100, according to various embodiments.

Figure 10:
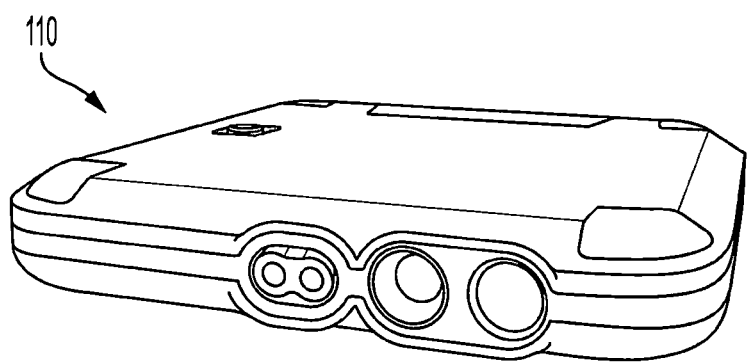
FIG. 10 illustrates another perspective view of the detachable portion of the detachable auxiliary power system, according to various embodiments.

FIG. 10 illustrates another perspective view of the detachable portion 110 of the detachable auxiliary power system 100, according to various embodiments.

Figure 11:
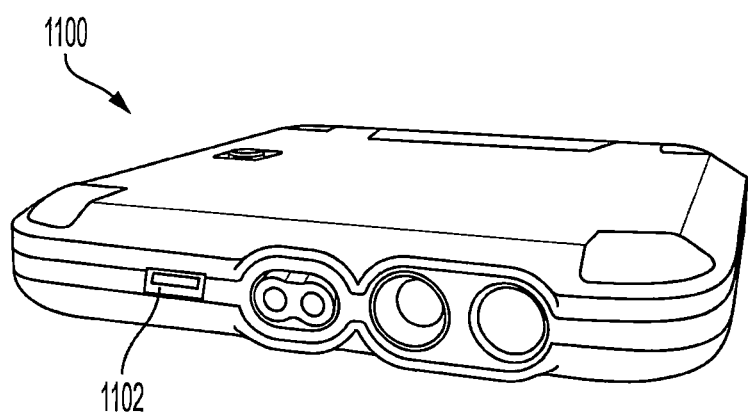
FIG. 11 illustrates another perspective view of another detachable portion of the detachable auxiliary power system, according to various embodiments.

FIG. 11 illustrates another perspective view of another detachable portion 1100 of the detachable auxiliary power system 100, according to various embodiments. The detachable portion 1100 may include one or more of the features of the detachable portion 110 (FIG. 1) discussed throughout this disclosure. The detachable portion 1100 may further include a USB port 1102. A user may connect a device (such as a cell phone) to the USB port 1102, and the USB port 1102 may provide power to the device. For example, the detachable portion 1100 may include circuitry that couples the USB port 1102 to a battery of the detachable portion 1100, where the circuitry provides a suitable voltage for connection to the device (such as five volts). Detachable portion 1100 may further include one or more additional ports of the same or a different configuration of USB port 1102, to supply power to various accessories. For example, detachable portion 110 may include one or more of a cigarette lighter receptacle, and/or one or more standard wall sockets to provide 110/120 VAC. Where detachable portion 1100 supplies 110/120 VAC, it may be equipped with inverter circuitry. Detachable portion 110 may be equipped with one or more fuses or other safety devices to prevent damage if overloaded with too many devices or if too great a current is demanded from detachable portion 110.

Figure 12:
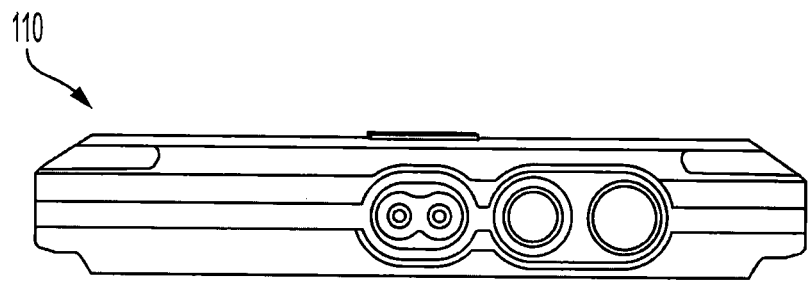
FIG. 12 illustrates a side view of the detachable portion of the detachable auxiliary power system, according to various embodiments.

FIG. 12 illustrates a side view of the detachable portion 110 of the detachable auxiliary power system 100, according to various embodiments. In particular, FIG. 12 illustrates a backside view of the detachable portion 110.

Figure 13:
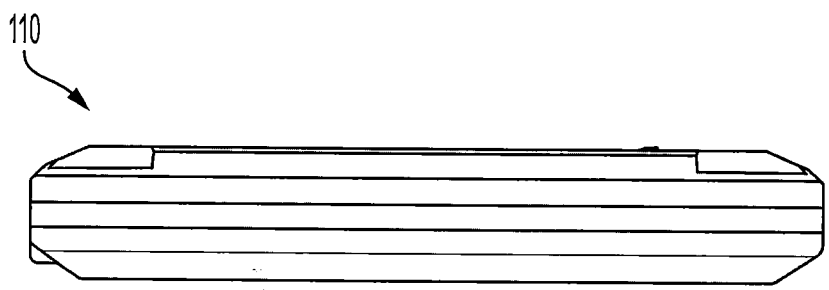
FIG. 13 illustrates another side view of the detachable portion of the detachable auxiliary power system, according to various embodiments.

FIG. 13 illustrates another side view of the detachable portion 110 of the detachable auxiliary power system 100, according to various embodiments. In particular, FIG. 13 illustrates a side view of the detachable portion 110.

Figure 14:
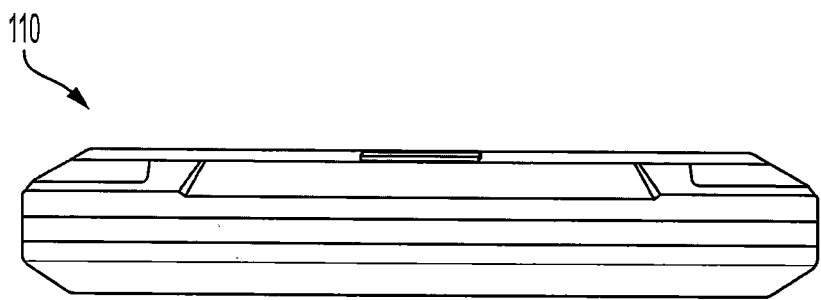
FIG. 14 illustrates another side view of the detachable portion of the detachable auxiliary power system, according to various embodiments.

FIG. 14 illustrates another side view of the detachable portion 110 of the detachable auxiliary power system 100, according to various embodiments. In particular, FIG. 14 illustrates a front side view of the detachable portion 110.

Figure 15:
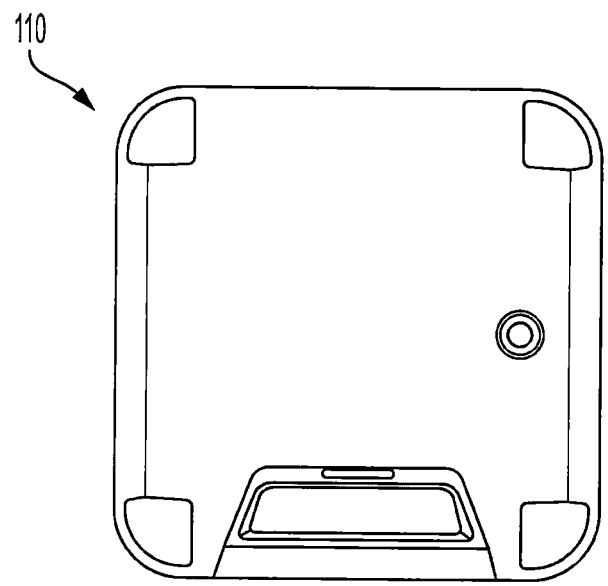
FIG. 15 illustrates a top view of the detachable portion of the detachable auxiliary power system, according to various embodiments.

FIG. 15 illustrates a top view of the detachable portion 110 of the detachable auxiliary power system 100, according to various embodiments.

Figure 16:
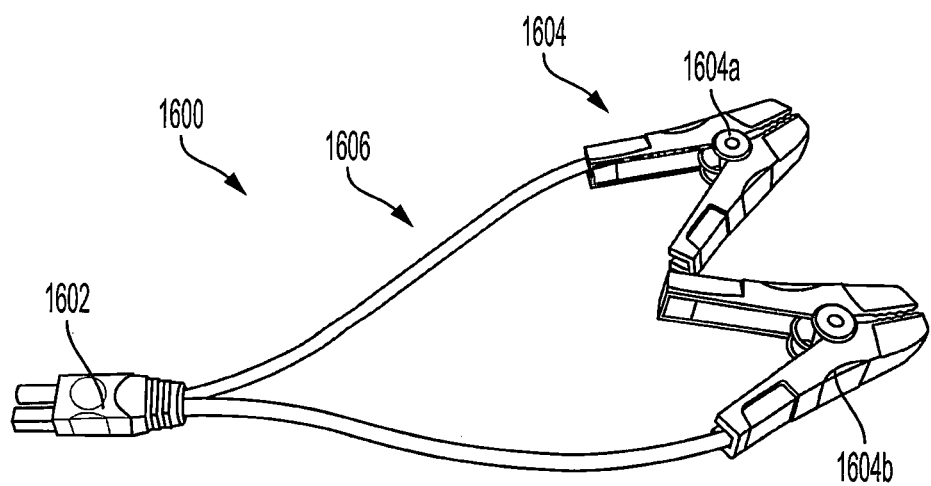
FIG. 16 illustrates a jumper cable 1600 for the detachable auxiliary power system 100, according to various embodiments.

FIG. 16 illustrates a jumper cable 1600 for the detachable auxiliary power system 100, according to various embodiments. In particular, the jumper cable 1600 may be coupled to the connector 808 (FIG. 8) of the detachable portion 110 (FIG. 1) of the detachable auxiliary power system 100 (FIG. 1) and may couple the detachable portion 110 to the vehicle battery or vehicle electrical system, or a battery or vehicle electrical system of the same or another vehicle for providing power to the vehicle battery or the battery of the other vehicle.

The jumper cable 1600 may include a connector 1602. The connector 1602 may couple to the connector 808. The jumper cable 1600 may further include a pair of clamps 1604 that couple to the vehicle battery or vehicle electrical system, or the battery or vehicle electrical system of another vehicle. In particular, the pair of clamps 1604 may include a first clamp 1604a that is to couple to a negative terminal of the vehicle battery or a suitable negative terminal of the vehicle electrical system, or the negative terminal of the battery or a suitable negative terminal of the vehicle electrical system of the other vehicle, and a second clamp 1604b that is to couple to a positive terminal of the vehicle battery or suitable positive terminal of the vehicle electrical system, or a positive terminal on the battery or a suitable positive terminal of the vehicle electrical system of the other vehicle. In other embodiments, the pair of clamps 1604 may be replaced, or replaceable, by other connectors that may couple to the terminals of the vehicle battery or the vehicle electrical system, or the terminals of the battery or the vehicle electrical system of the other vehicle. The jumper cable 1600 may further include a pair of cables 1606 that couple the connector 1602 to the pair of clamps 1604.

In some embodiments, jumper cable 1600 may plug into a separate port from connector 808, where connector 808 may be dedicated to connecting with housing 102 when detachable portion 110 is docked to housing 102. Such a separate port may be directly connected to the battery of detachable portion 110, and so always be energized. In other embodiments, button 810 may be depressed to energize connector 808 and jumper cable 1600, such as once jumper cable 1600 is connected to a car battery and is ready to jump-start. In still other embodiments, connector 808 may always be directly connected to the battery of detachable portion 110 without the need to depress button 810, such as where the switching circuitry is located in housing 102. In some embodiments, detachable portion 110 may include circuitry to detect if jumper cable 1600 is incorrectly hooked up or is shorted, e.g. where first clamp 1604a and second clamp 1604b are inadvertently connected together; such circuitry could prevent coupling or decouple the battery from the vehicle's electrical system to prevent damage. In other embodiments, the detachable portion 110 could include circuitry to prevent coupling or decouple the battery from the electrical system if the vehicle's battery is not connected to, or becomes disconnected from, the vehicle's electrical system.

Figure 17:
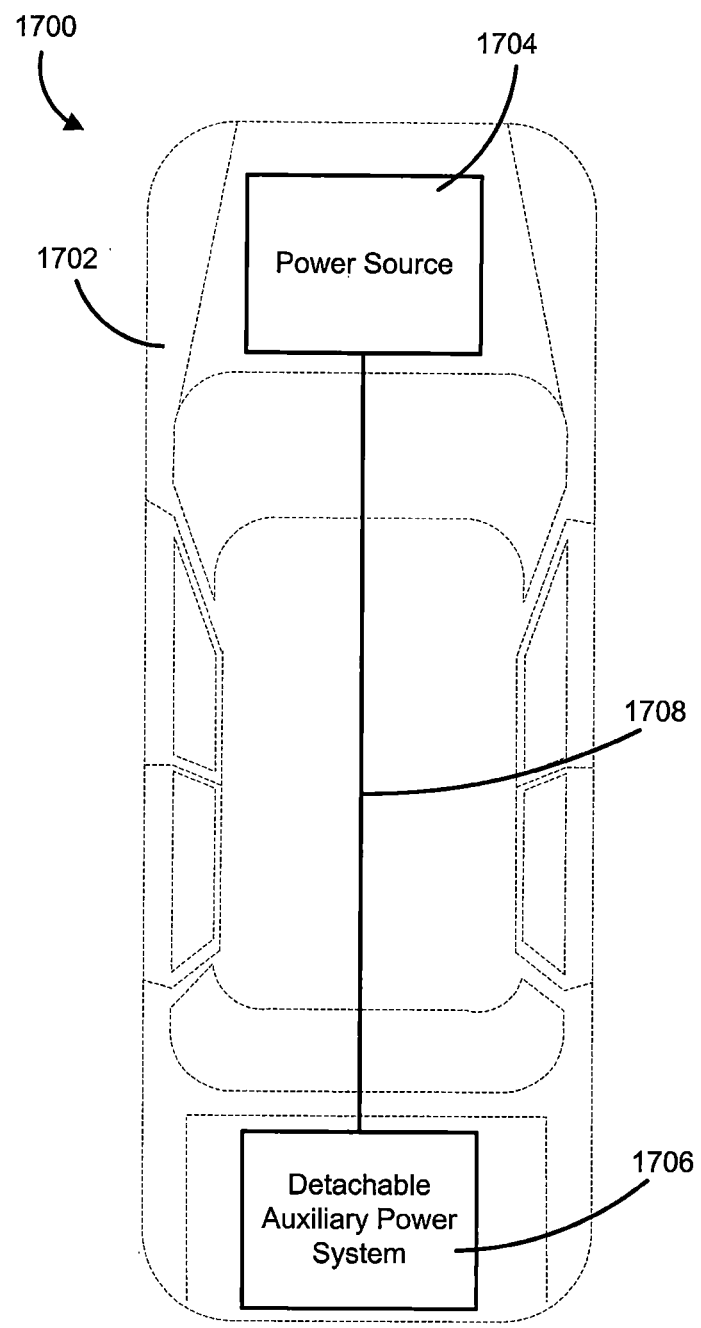
FIG. 17 illustrates a top view of a vehicle arrangement 1700 for a detachable auxiliary power system, according to various embodiments.

FIG. 17 illustrates a top view of a vehicle arrangement 1700 for a detachable auxiliary power system, according to various embodiments. In particular, the vehicle arrangement 1700 include a vehicle 1702. The vehicle 1702 may include a power source 1704. The power source 1704 may comprise a vehicle battery and/or alternator or generator located under a hood of the vehicle 1702.

A detachable auxiliary power system 1706 may be mounted within the vehicle 1702. The detachable auxiliary power system 1706 may include one or more of the features of the detachable auxiliary power system 100 (FIG. 1). In the illustrated embodiment, the detachable auxiliary power system 1706 is mounted within a trunk of the vehicle 1702. In other embodiments, the detachable auxiliary power system 1706 may be mounted in different locations within the vehicle 1706, such as under a seat or under the hood of the vehicle 1702.

The detachable auxiliary power system 1706 may be coupled to the power source 1704 by a power cable 1708 routed within the vehicle 1702. The power cable 1708 may include one or more of the features of the power cable 106 (FIG. 1) and may extend from a housing (such as the housing 102 (FIG. 1)) of the detachable auxiliary power system 1706. The power cable 1708 may couple the detachable auxiliary power system 1706 to the power source 1704. For example, the power cable 1708 couples the detachable auxiliary power system 1706 directly to the power source 1704 in the illustrated embodiment. In other embodiments, the power cable 1708 may be coupled the detachable auxiliary power system 1706 to the power source 1704 via a power port (such as a cigarette lighter, a USB port, or other power outlets of the vehicle).

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A detachable auxiliary power system, comprising:
   a housing, comprising:
      a retaining mechanism; and
      a first power connector disposed upon the housing;

a detachable portion, configured to be received by the housing, the detachable portion comprising:
　a power source;
　a second power connector disposed so as to connect with the first power connector when the detachable portion is received by the housing;
power management circuitry electrically connected to the power source; and
a power cable electrically connected to the first power connector, and adapted to be connected to an external electrical system;
wherein the power management circuitry is configured to selectively charge the power source from electricity received from the power cable and to supply electricity from the power source to the power cable.

2. The power system of claim 1, wherein the power source is a Lithium-Ion, lithium Iron Phosphate, or Lithium-Polymer battery.

3. The power system of claim 1, wherein the power management circuitry is further configured to supply electricity from the power source to the power cable by actuation of a button or switch.

4. The power system of claim 3, wherein the electricity is supplied from the power source for a predetermined amount of time following actuation of the button or switch.

5. The power system of claim 1, wherein the detachable portion is releasably retained to the housing by the retaining mechanism.

6. The power system of claim 1, wherein the detachable portion further comprises one or more signaling devices.

7. The power system of claim 6, wherein one of the signaling devices comprises a plurality of flashing lights.

8. The power system of claim 6, wherein the detachable portion further comprises a flashlight.

9. The power system of claim 8, wherein the detachable portion further comprises at least one accessory power port.

10. The power system of claim 9, wherein the at least one accessory power port is one of a USB port, a cigarette lighter port, and a wall socket.

11. The power system of claim 1, wherein the external electrical system comprises a vehicle electrical system.

12. The power system of claim 1, wherein the housing further comprises at least one mounting point for securing the housing to a substrate.

* * * * *